US007860814B1

(12) United States Patent
Plotnick

(10) Patent No.: US 7,860,814 B1
(45) Date of Patent: Dec. 28, 2010

(54) SYSTEM AND METHOD FOR PROVIDING A USER-SELECTED BEST SOLUTION TO AN NP-COMPLETE SCHEDULING PROBLEM

(76) Inventor: Fredric L. Plotnick, Benson Manor #117, 101 Washington La., Jenkintown, PA (US) 19046

( * ) Notice: Subject to any disclaimer, the term of this patent is extended or adjusted under 35 U.S.C. 154(b) by 675 days.

(21) Appl. No.: 11/738,028

(22) Filed: Apr. 20, 2007

Related U.S. Application Data

(60) Provisional application No. 60/793,416, filed on Apr. 20, 2006.

(51) Int. Cl.
*G06F 15/18* (2006.01)
*G06N 3/00* (2006.01)
*G06N 3/12* (2006.01)
(52) U.S. Cl. ....................................................... 706/13
(58) Field of Classification Search ................... 706/13
See application file for complete search history.

(56) References Cited

U.S. PATENT DOCUMENTS

| | | | | |
|---|---|---|---|---|
| 5,155,801 | A | * | 10/1992 | Lincoln ........................ 706/20 |
| 5,291,397 | A | | 3/1994 | Powell |
| 5,408,663 | A | | 4/1995 | Miller |
| 5,913,201 | A | | 6/1999 | Kokur |
| 6,606,529 | B1 | | 8/2003 | Crowder, Jr. et al. |
| 6,636,840 | B1 | | 10/2003 | Goray et al. |
| 2003/0055571 | A1 | | 3/2003 | Sakakibara et al. |
| 2003/0149717 | A1 | | 8/2003 | Heinzman |
| 2003/0187696 | A1 | * | 10/2003 | Bonissone et al. ............. 705/4 |
| 2003/0233303 | A1 | | 12/2003 | Elazouni |
| 2005/0187845 | A1 | | 8/2005 | Eklund et al. |
| 2005/0237950 | A1 | | 10/2005 | Yuan et al. |

OTHER PUBLICATIONS

Wu et al. "Job-shop Scheduling using Genetic Algorithm", IEEE SMC, 1996, pp. 1994-1999.*
Zanchettin et al. "Hybrid Technique for Artificial Neural Network Architecture and Weight Optimization", PKDD, 2005, LNAI 3721, pp. 709-716.*
Dubois et al. "On the use of aggregation operations in information fusion processes", Fuzzy Sets and Systems 142 (2004) pp. 143-161.*
Website, http://www.netmba.com/operations/project/cpm/, "CPM—Critical Path Method," Dec. 2005.

* cited by examiner

*Primary Examiner*—Michael B. Holmes
*Assistant Examiner*—Li-Wu Chang
(74) *Attorney, Agent, or Firm*—Knoble, Yoshida & Dunleavy, LLC

(57) ABSTRACT

A method for providing "best" solutions of NP-complete problems. A plurality of algorithms are provided for solving the NP-complete problem, the problem is automatically solved using the provided algorithms and a best solution is selected based on application of predetermined criteria. In one embodiment, scheduling of large or complex projects utilizing limited resources is performed using the method of the invention. Algorithms are provided based on information relating to the constraints of limited resources overlain upon a logic network of restraints between events and activities in a sequence to model the real world. The generated rule sets can be applied to generate multiple schedules from which a particular schedule may be selected. A system for implementation of the method using a computer and a computer program is also provided.

15 Claims, 4 Drawing Sheets

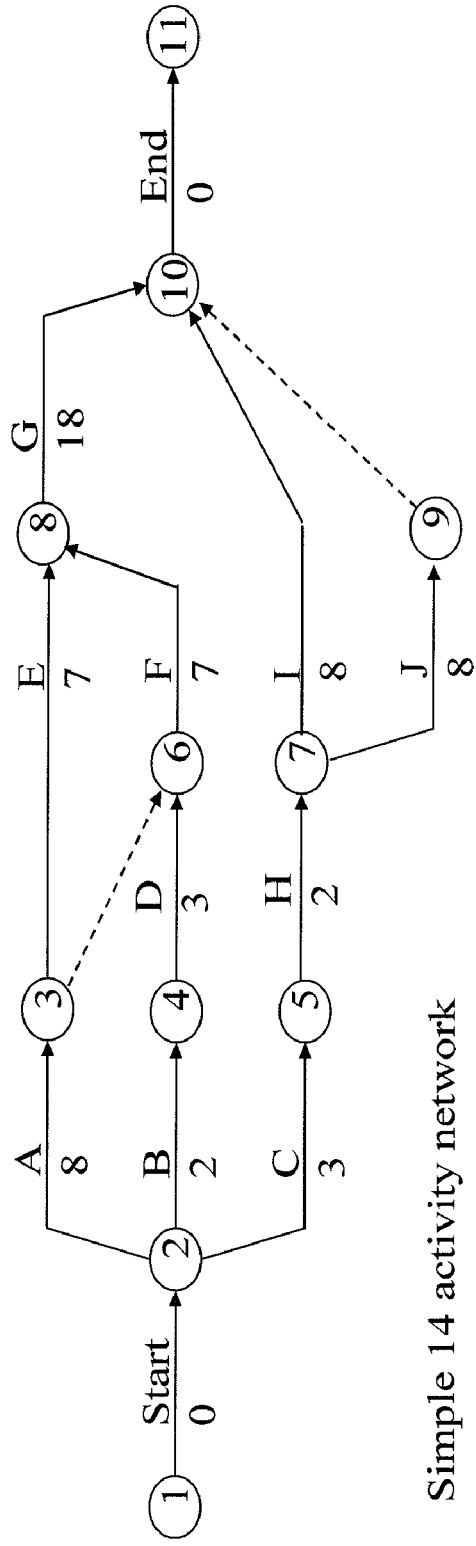
Figure 1A – Prior Art

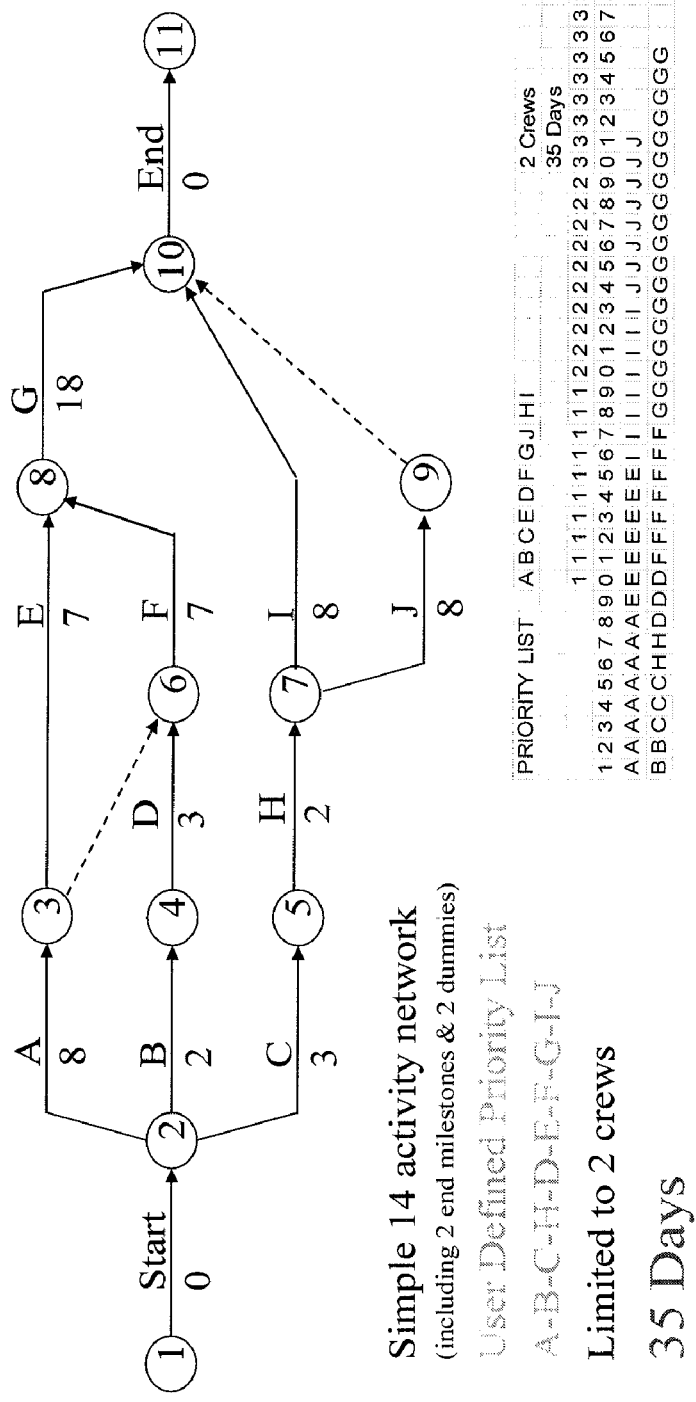
Figure 1B – Prior Art

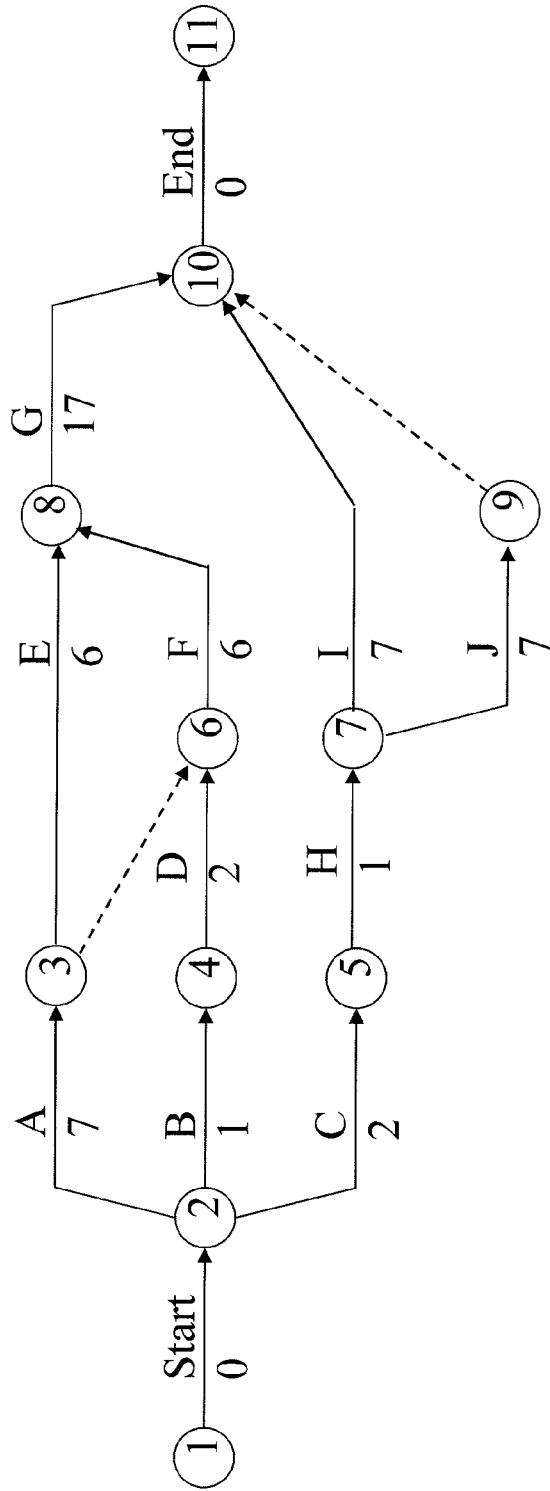
Figure 1C – Prior Art
- Simple 14 activity network (including 2 end milestones & 2 dummies)
- Default Priority List (a, b, c, ...)
- Limited to 2 crews
- Reduce ALL Durations by 1
- 36 Days

SYSTEM AND METHOD FOR PROVIDING A USER-SELECTED BEST SOLUTION TO AN NP-COMPLETE SCHEDULING PROBLEM

CROSS-REFERENCE TO RELATED APPLICATIONS

This application claims the benefit of U.S. provisional application No. 60/793,416, filed on Apr. 20, 2006, under 35 U.S.C. §119(e), the text of which is hereby incorporated by reference in its entirety.

BACKGROUND OF THE INVENTION

1. Field of the Invention

The invention relates to the field of handling NP-complete problems. In particular the invention relates to the provision of a method and system to provide reasonable solutions to NP-complete problems in a practical manner.

2. Description of the Related Technology

Many mathematical problems are not subject to an optimal solution by either an algorithmic approach or an heuristic approach, (e.g. trial and error methods). On area in which this is a particular problem is with network logic diagrams and other non-deterministic polynomial time-complete (NP-complete) problems. These types of problems are encountered in many fields such as graph theory, network design, sets and partitions, data storage and retrieval, sequencing and scheduling, mathematical programming, algebra and number theory, games and puzzles, logic, automation, language theory, program optimization, as well as other areas.

In such cases, the only practical means of determining a reasonably good answer is to solve the problem using one or more of a potentially infinite number of algorithms, repeat this process a finite number of times and compare the results to choose a best answer. Alternatively, heuristic methods can be employed. Both approaches are time-consuming and tedious for implementation by, for example, non-technical personnel.

There are a variety of alternative approaches to the solution of NP-complete problems. For example, U.S. Pat. No. 5,913,201 (Kocur) uses a combination of linear programming and a heuristic to address an NP-complete problem in the area of scheduling.

U.S. Pat. No. 6,606,529 provides a method for finding a solution to a multi-task scheduling problem by applying artificial intelligence to partition or fragment the problem into a set of mathematically independent scheduling problems, selecting one of a plurality of algorithms which will provide an optimal solution in minimal time to each sub-problem, repeating the process for each sub-problem and then combining the solutions to provide an optimal solution. This method, however, has the drawback that each type of scheduling sub-problem must be anticipated and a suitable algorithm for solving it must be provided.

U.S. Pat. No. 6,636,840 provides a method for solving NP-complete problems. The system is configured to solve the minimal Hamiltonian cycle of a primary network comprised either of edges having non-binary or binary valued weights. The solutions are arrived at by changing the weighting of the edges in the system and repeating the calculations until a predetermined condition is satisfied.

In the field of project planning and management, NP-complete problems are frequently encountered. The Critical Path Method (CPM) is one of several related techniques that employ level for project planning. CPM is used to analyze projects that involve a number of individual activities. It analyzes what activities have the least amount of scheduling flexibility (i.e., are the most mission-critical) and then predicts the duration of the project based on the activities that fall along the so-called "critical path." Activities that are part of the critical path cannot be delayed without delaying the finish time for the entire project. The CPM may involve graphically diagramming how each activity is related to the others. An example of this diagramming can be seen in FIG. 1. In FIG. 1 each letter represents an activity that needs to be completed and each number represents a node that indicates when that activity needs to be completed in relation to the other activities. Time estimates are then given to each of the activities in order to estimate how long it will take to complete the activity. The longest path in the diagram is the critical path and provides an estimate of the time needed to complete a project. It also illustrates which activities are not critical for the completion of a project in a timely fashion.

Leveling, defined as the scheduling of activities of a logic network restricted to finite resources, is one example of a NP-Complete problem. For a network of n activities, there are possible n−1 choices of preferred sequence priority of performances leading to the shortest time required for completion of all activities in the logic network. Increasing or decreasing the durations of individual activities may have an impact to this process that is counter-intuitive, such as a decrease of one day duration for each activity yielding a longer total project completion. This is exemplified in FIGS. 1A-1C of the present application.

If the logic network is scheduled (by a CPM algorithm) prior to leveling, priority may be assigned by one of the calculated attributes of the scheduling algorithm rather than by a random choice of the n−1 possibilities. The number of these calculated attributes (as well as input attributes) is far fewer than the number of activities in the typical project. (Calculated attributes may include early start, early finish, late start, late finish, total float, free float, independent float and possibly others. Input attributes may include duration, number of limited resources, number of predecessors, number of successors and possibly others.)

In most cases where scheduling is performed prior to leveling, the leveling routine will yield an earlier completion time. However, the choice of which attribute(s) may be the basis of priority, and order thereof where more than one attribute is chosen, can yield dramatically differing results. For example, where many limited resources are being allocated amongst activities, the difference in which priority list is used can result in a total project duration double that of the optimum or shortest project duration.

The "fix" often suggested by software vendors is to level the project based upon the manual development of a priority list, or priority scheme of choice of order of attributes, sequentially repeating the process for several other priority lists, manually determining which priority list yields the best results and then rekeying the priority list that provided that best result. For all but those projects where every activity is performed exactly as planned, this process must be repeated for each review period. The review period will typically range from one week to one month in the construction industry. The review period will typically range from fifteen minutes to one shift in the manufacturing sector. Other industries will have similar typical ranges of review periods. Although there may be several hundred to thousands of possible priority list schemes, the software vendors will typically recommend the use of a select few priority lists as the basis for the process noted above.

Computer programs have been developed to help facilitate the planning of projects. Typically after entering in the necessary information to create a plan for the project, certain rule sets are adjusted and entered into the computer program using trial and error, in order to determine the effect these rule sets on the overall project. This trial and error method wastes valuable time in providing with a project plan. As a practical result, an exceedingly few licensees of CPM scheduling software with leveling capabilities actually use this function, instead usually manually leveling their schedules by a "seat of the pants" allocation of resources that may, or may not, approach an optimal solution.

Therefore, there exists a need for providing an efficient method for applying a number of rule sets to a proposed list of activities and determining which rule set is optimal, given the goals of the project.

SUMMARY OF THE INVENTION

Accordingly, it is an object of certain embodiments of the invention to provide an efficient method for handling NP-complete problems.

One aspect of the invention involves a method for providing a solution to an NP-complete problem by providing a small number of predetermined algorithms that provide reasonable solutions to the NP-complete problem, employing the provided algorithms to automatically generating a plurality of solutions to the NP-complete problem, and automatically selecting the algorithm that provides the best of the plurality of solutions based on application of predetermined criteria.

Another aspect of the present invention relates to the application of the invention in the field of project planning or management. In this field, the invention involves providing a small number of predetermined algorithms which provide reasonable project schedules, employing the selected algorithms to automatically generate a plurality of solutions to the scheduling problem and selecting the algorithm that generated the best of the plurality of solutions based on application of predetermined criteria.

In a further aspect, the present invention relates to a software implementation of the method of the invention. In the software implementation, a small number of algorithms that provide reasonable solutions to the NP-complete problem are pre-programmed into software for solving the problem, the pre-programmed algorithms are employed to automatically provide a plurality of solutions to the NP-complete problem, and the software selects the algorithm that provided the best of the plurality of solutions based on application of predetermined criteria.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIGS. 1A-1C show conventional critical path method diagrams and illustrates the problems that may be encountered leveling schedules utilizing prior art methods.

DETAILED DESCRIPTION OF THE PREFERRED EMBODIMENTS

Figure 2:
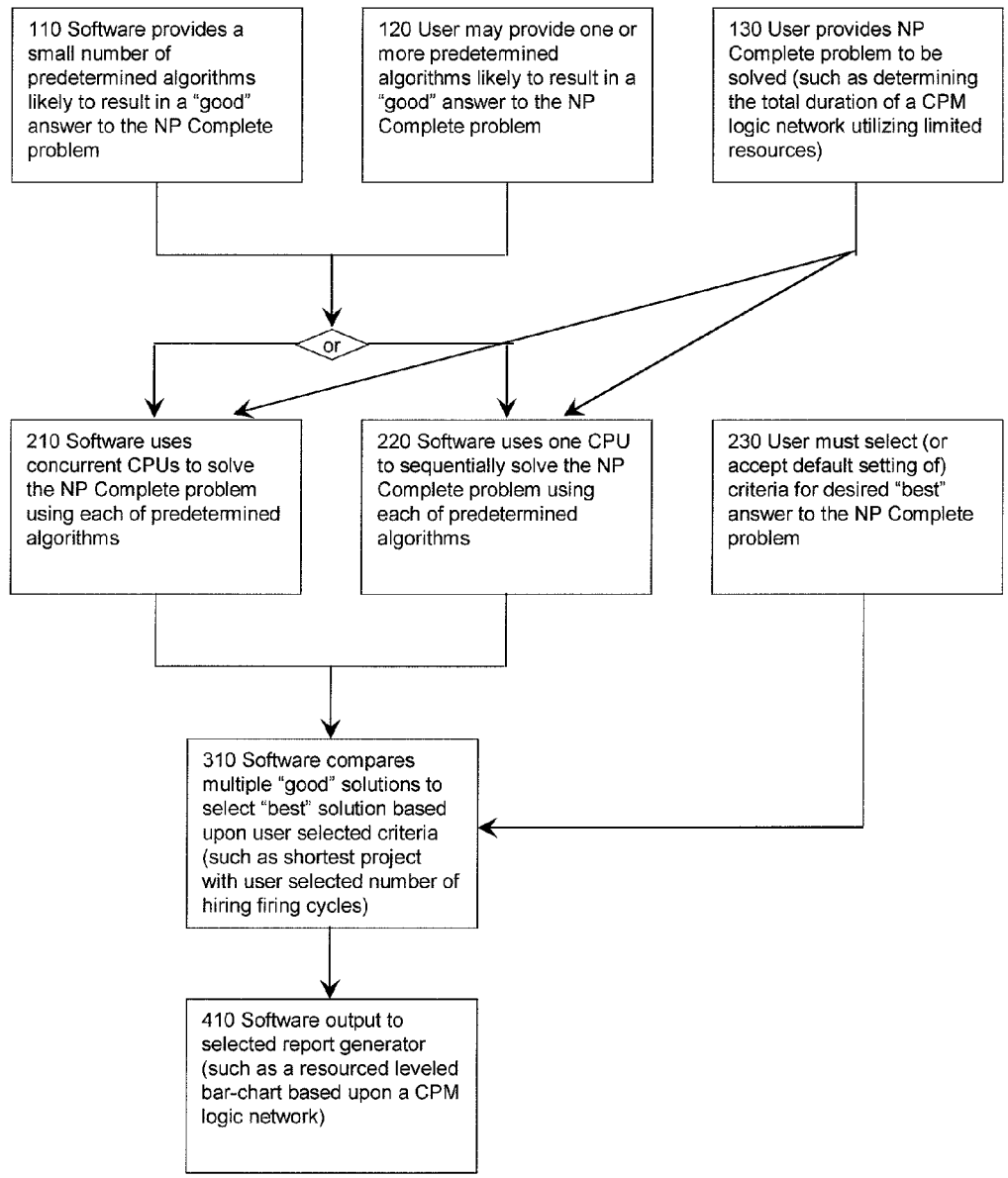
FIG. 2 shows a flow chart depicting a method in accordance with the present invention for solving NP-complete problems.

One aspect of the invention involves a method for providing a solution to an NP-complete problem by providing a small number of predetermined algorithms that provide reasonable solutions to the NP-complete problem, employing the provided algorithms to automatically generating a plurality of solutions to the NP-complete problem, and automatically selecting the algorithm that provides the best of the plurality of solutions based on application of predetermined criteria.

The term, "algorithm" as used herein can encompass algorithms, rule sets and/or priority lists, depending upon the specific type of NP-complete problem that is being addressed.

FIG. 2 is a flow chart showing a method for automated solution of NP-complete problems in accordance with the present invention. This method may be used with a computer system that has parallel processing capability. In step 110 a set of predetermined algorithms for solving the problem are provided by the software. These predetermined algorithms may be based upon research relating to likely priority lists. Skilled persons are capable of providing such predetermined algorithms. In step 120 an additional set or sets of algorithms may be provided by a user with a greater than average experience in this field. In step 130 the data comprising the NP Complete problem is provided.

The problem is automatically solved using the predetermined algorithms in step 210, during which step the parallel processing capability of the computer may be employed, or alternately in step 220 where the individual predetermined algorithms may be employed sequentially. In step 230 the user may provide criteria for determining the "best" outcome, or leave such to the defaults set by the software. In step 310, the computer program will select the best solutions based on application of predetermined criteria. In step 410 the methods may go on to select the particular algorithm that generated the best solution and report the results of that choice. Optionally, for experienced users and specialists, the results of the other choices may be stored and retrievable.

One improvement provided by this new business method is to encode the recommended selection of algorithms, rule sets or priority lists as part of the software or system to then allow the software to run each sequentially or concurrently (depending upon computer architecture) and then to list only the best result of the several attempts, possibly also recording results for alternates as part of a user accessible log. Since the average user of the system is only looking for the "best" result within the resource limits set, and does not care which algorithm worked best during this review period, this provides the non-technical software user with only the information required.

The system of the present invention may also, optionally, allow the user to develop one or more user selected algorithms, rule sets or priority lists to be run concurrently with the algorithms provided by the system. This allows the user additional flexibility to try alternative solutions to the NP-complete problem, if desired.

As discussed above in the background section, the present invention is generally applicable to any type of NP-complete problem, such as those listed above. However, for the purpose of this patent application, specific examples of the implementation of the system are provided in the context of a scheduling algorithm.

A project manager that utilizes a computer program to accomplish project scheduling using CPM typically has to manually determine a number of different rule sets to apply in order to generate a plurality of paths and eventually select the schedule. Changing the rules used to determine the factors that may influence the path may affect the timing and priority of the activities in the project. Once the various rule sets are determined by the project manager, the various rule sets must be entered into the computer program to see how each rule set affects the path to completion of the project. In addition, once the desired rule set is determined, it typically must be reentered by the project manager into the computer program. This process is time consuming and prone to human error.

In the instant invention, once the activities are selected, the interrelationships between the activities are determined and the various restraints are inputted, the computer program will automatically apply a number of pre-programmed algorithms or rule sets to produce a series of paths or project schedules. These paths or project schedules are then compared automatically by the computer in order to determine which path or schedule is the best schedule for completion of the project, based on one or more predetermined criteria, such as overall project cost, project completion time, most efficient use of resources, or various combinations thereof.

The use of different algorithms or rule sets to determine their overall affect on the scheduling of a project is sometimes referred to as leveling or smoothing. Use of a standard leveling and smoothing algorithm to form priority rule sets requires consideration of a variety of factors. For example, priority rule sets in the field of scheduling can be based on use of total float wherein the most critical activities are allocated resources first, as the criteria for determining priority. Other priority setting methods can be based on, for example, remaining duration of the step, wherein activities which require less time to complete get allocated resources first, early start, wherein activities starting soonest get allocated resources first, or combinations thereof. In such combinations, for example, total float could be the primary criteria for determining priority, whereas remaining duration could be a secondary criteria to resolve ties in the primary criteria.

In the present invention, the computer program is provided with the ability to generate or apply a plurality of algorithms or rule sets to automatically generate a plurality of paths or schedules based on inputted activities, interrelationships of activities and/or restraints. In one embodiment, the computer program has the ability to schedule using all inputted restraints.

The invention also makes it possible to provide concurrent prioritization list leveling and smoothing calculations can be performed. Due to the complexity of the calculations that may be involved in the implementation of the present invention, it may be advantageous to implement the invention using parallel processors and/or multi-mode computers, or other similar conventional means for increasing processing ability.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method for handling an NP-complete problem, comprising the steps of:
    (a) generating a resource allocation algorithm yielding a single schedule for performance of interrelated activities which is consistent with restraints on a sequence of performance of the interrelated activities employing a priority rule set to provide a method of prioritization of resource allocation for performance of the interrelated activities consistent with the restraints on the sequence of performance of the interrelated activities;
    (b) generating another resource allocation algorithm yielding a single schedule for performance of interrelated activities which is consistent with restraints on the sequence of performance of the interrelated activities employing a different priority rule set than was employed in a previous step of generating a resource allocation algorithm in order to provide a different method of prioritization of resource allocation for performance of the interrelated activities consistent with the restraints on the sequence of performance of the interrelated activities;
    (c) repeating step (b), if necessary, until a desired number of resource allocation algorithms has been generated;
    (d) storing the generated resource allocation algorithms in a computer prior to performing steps (e)-(g);
    (e) defining the NP-complete problem in the computer as a problem of scheduling a plurality of interrelated activities subject to a plurality of restraints on a sequence of performance of the activities;
    (f) solving, on the computer, the NP-complete problem defined by said activities interrelationships between said activities and said restraints using the plurality of generated resource allocation algorithms stored in said computer;
    said solving step solving each of said generated resource allocation algorithms once to generate a single schedule for performance of said interrelated activities which is consistent with said restraints on the sequence of performance of the activities from each of said generated resource allocation algorithms to thereby provide a number of schedules for performance of said interrelated activities which is consistent with said restraints on the sequence of performance of the activities equal to the number of resource allocation algorithms,
    (g) selecting a best schedule for performance of said interrelated activities from among the plurality of schedules for performance of said interrelated activities provided by said solving step based on application of user-selected criteria for determining a best schedule for performance of said interrelated activities.

2. The method of claim 1, wherein at least one said priority rule set is based upon a relationship between an activity and one or more restraints on the sequence of performance for a preceding or succeeding activity.

3. A system for solving an NP-complete problem for scheduling a plurality of interrelated activities subject to a plurality restraints on a sequence of performance of the activities, comprising:
    a computer;
    a program stored on said computer, wherein said program, when executed, performs the steps of:
    (a) generating a resource allocation algorithm yielding a single schedule for performance of interrelated activities which is consistent with restraints on the sequence of performance of the interrelated activities employing a priority rule set to provide a method of prioritization of resource allocation for performance of the interrelated activities consistent with the restraints on the sequence of performance of the interrelated activities;
    (b) generating another resource allocation algorithm yielding a single schedule for performance of interrelated activities which is consistent with restraints on the sequence of performance of the interrelated activities employed a different priority rule set than was employed in a previous step of generating a resource allocation algorithm in order to provide a different method of prioritization of resource allocation for performance of the interrelated activities consistent with the restraints on the sequence of performance of the interrelated activities;

(c) repeating step (b), if necessary, until a desired number of resource allocation algorithms has been generated;

(d) storing the generated resource allocation algorithms prior to performing steps (e)-(g);

(e) receiving said activities, interrelationships between said activities and one or more restraints on a sequence of performance of the activities;

(f) generating a number of schedules for performance of said interrelated activities, equal to the number of generated resource allocation algorithms for solving the NP-complete problem by solving each of said generated resource allocation algorithms using said received restraints on the sequence of performance of the interrelated activities to provide one schedule for performance of said interrelated activities from each of said generated resource allocation algorithms; and (g) selecting a best schedule for performance of said interrelated activities from among the generated schedules for performance of said interrelated activities based upon application of user-selected criteria for determining a best schedule for performance of said interrelated activities.

4. The system of claim 3, wherein at least one said priority rule set is based upon a relationship between an activity and one or more restraints on the sequence of performance for a preceding or succeeding activity.

5. The method of claim 1, wherein the user-selected criteria are selected from the group consisting of cost, completion time, efficient use of resources and combinations thereof.

6. The system of claim 3, wherein the user-selected criteria are selected from the group consisting of cost, completion time, efficient use of resources and combinations thereof.

7. A method for generating and displaying a path or project schedule involving an NP-complete problem for scheduling, comprising the steps of:

(a) generating a resource allocation algorithm yielding a single schedule for performance of interrelated activities which is consistent with restraints on a sequence of performance of the interrelated activities employed a priority rule set to provide a method of prioritization of resource allocation for performance of the interrelated activities consistent with the restraints on the sequence of performance of the interrelated activities;

(b) generating another resource allocation algorithm yielding a single schedule for performance of interrelated activities which is consistent with restraints on the sequence of performance of the interrelated activities employing a different priority rule set than was employed in a previous step of generating a resource allocation algorithm in order to provide a different method of prioritization of resource allocation for performance of the interrelated activities consistent with the restraints on the sequence of performance of the interrelated activities;

(c) repeating step (b), if necessary, until a desired number of resource allocation algorithms has been generated;

(d) storing the generated resource allocation algorithms in a computer prior to performing steps (e)-(h);

(e) defining the NP-complete problem in the computer as a problem of scheduling a plurality of interrelated activities subject to a plurality of restraints on a sequence of performance of the activities;

(f) solving, on the computer, the NP-complete problem defined by said activities, interrelationships between said activities and said restraints using the plurality of generated resource allocation algorithms stored in the computer to provide a plurality of solutions to the NP-complete problem in the form of paths or project schedules for performance of said interrelated activities, (g) selecting a best path or project schedule for performance of said interrelated activities from among the paths or project schedules for performance of said interrelated activities provided by said solving step based on application of user-selected criteria for determining a best path or project schedule for performance of said interrelated activities, and (h) displaying the selected path or project schedule for performance of said interrelated activities.

8. The method of claim 7, wherein said priority rule set is based upon a relationship between an activity and one or more restraints on the sequence of performance for a preceding or succeeding activity.

9. The method of claim 7, wherein the user-selected criteria are selected from the group consisting of cost, completion time, efficient use of resources and combinations thereof.

10. The method of claim 1, wherein one said priority rule set determines priority of activities based on allocated resources.

11. The system of claim 3, wherein one said priority rule set determines priority of activities based on allocated resources.

12. The method of claim 7, wherein one said priority rule set determines priority of activities based on allocated resources.

13. The method of claim 1, wherein one said priority rule set determines priority of activities based on a duration of one or more activities.

14. The system of claim 3, wherein one said priority rule set determines priority of activities a duration of one or more activities.

15. The method of claim 7, one said priority rule set determines priority of activities a duration of one or more activities.

* * * * *